US010800097B2

(12) United States Patent
Chanclon et al.

(10) Patent No.: US 10,800,097 B2
(45) Date of Patent: Oct. 13, 2020

(54) OUTLET STRUCTURE

(71) Applicant: Hewlett-Packard Development Company, L.P., Houston, TX (US)

(72) Inventors: Ismael Chanclon, Sant Cugat del Valles (ES); Xavier Alonso, Sant Cugat del Valles (ES); Ernesto Alejandro Jones Poppescou, Barcelona (ES); Marc Morros, Terrassa (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 78 days.

(21) Appl. No.: 16/069,805

(22) PCT Filed: May 12, 2016

(86) PCT No.: PCT/EP2016/060793
§ 371 (c)(1),
(2) Date: Jul. 12, 2018

(87) PCT Pub. No.: WO2017/194149
PCT Pub. Date: Nov. 16, 2017

(65) Prior Publication Data
US 2019/0070776 A1 Mar. 7, 2019

(51) Int. Cl.
*B29C 64/255* (2017.01)
*B29C 64/209* (2017.01)
(Continued)

(52) U.S. Cl.
CPC .......... *B29C 64/209* (2017.08); *B29C 64/153* (2017.08); *B29C 64/20* (2017.08);
(Continued)

(58) Field of Classification Search
CPC ............................ B29C 64/255; B29C 64/259
See application file for complete search history.

(56) References Cited

U.S. PATENT DOCUMENTS 4,710,098 A   12/1987  Anders et al.
8,185,229 B2   5/2012  Davidson
(Continued)

FOREIGN PATENT DOCUMENTS

CN   101509568 A   8/2009
CN   102164735 A   8/2011
(Continued)

OTHER PUBLICATIONS

Anthony K. Au et al., "3D-Printed Microfluidic Automation", Lab Chip vol. 15, Issue 8, Mar. 31, 2015, 9 pages. < http://www.ncbi.nlm.nih.gov/pmc/articles/PMC4382387/ >.
(Continued)

*Primary Examiner* — Timothy Kennedy
(74) *Attorney, Agent, or Firm* — HP Inc. Patent Department

(57) ABSTRACT

A 3D printing build material container outlet structure is described. The outlet structure comprises a valve element having an open configuration to enable a tube, when inserted in the outlet structure, to aspirate build material from the container; and a closed configuration to inhibit build material from exiting the container. The valve element changes from the closed configuration to the open configuration by at least one of: the tube being inserted in the outlet structure; and a vacuum force being applied to the outlet structure when the tube has been inserted in the outlet structure.

20 Claims, 10 Drawing Sheets

(51) Int. Cl.
 *B33Y 30/00* (2015.01)
 *B33Y 40/00* (2020.01)
 *B29C 64/20* (2017.01)
 *B29C 64/153* (2017.01)
 *B33Y 10/00* (2015.01)

(52) U.S. Cl.
 CPC ............ *B29C 64/255* (2017.08); *B33Y 30/00* (2014.12); *B33Y 40/00* (2014.12); *B33Y 10/00* (2014.12)

(56) References Cited

U.S. PATENT DOCUMENTS

| | | |
|---|---|---|
| 8,955,558 B2 | 2/2015 | Bosveld et al. |
| 9,121,058 B2 | 9/2015 | Stern et al. |
| 2007/0034592 A1 | 2/2007 | Pavlovic et al. |
| 2008/0241404 A1 | 10/2008 | Allaman et al. |
| 2010/0192806 A1 | 8/2010 | Heugel et al. |
| 2015/0217514 A1* | 8/2015 | Maier .................. B29C 64/255 264/241 |

FOREIGN PATENT DOCUMENTS

| | | |
|---|---|---|
| CN | 105026276 A | 11/2015 |
| DE | 102006055326 A1 | 5/2008 |
| WO | WO-9619404 A1 | 6/1996 |

OTHER PUBLICATIONS

International Search Report and Written Opinion dated Feb. 15, 2017, PCT Patent Application No. PCT/EP2016/060793, filed May 12, 2016, European Patent Office.

\* cited by examiner

OUTLET STRUCTURE

CLAIM FOR PRIORITY

The present application is a national stage filing under 35 U.S.C. § 371 of PCT application number PCT/EP2016/060793, having an international filing date of May 12, 2016, the disclosure of which is hereby incorporated by reference in its entirety.

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built as a new layer or upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may for example comprise powder material, paste material, slurry material or liquid material. The build material is usually provided in a source container from where it is to be transferred to the building area or building compartment of the additive manufacturing apparatus where the actual manufacturing takes place.

DRAWINGS

Various features and advantages of the present disclosure will be apparent from the detailed description which follows, taken in conjunction with the accompanying drawings, which together illustrate, by way of example only, features of the present disclosure, and wherein.

DESCRIPTION

Figure 1:
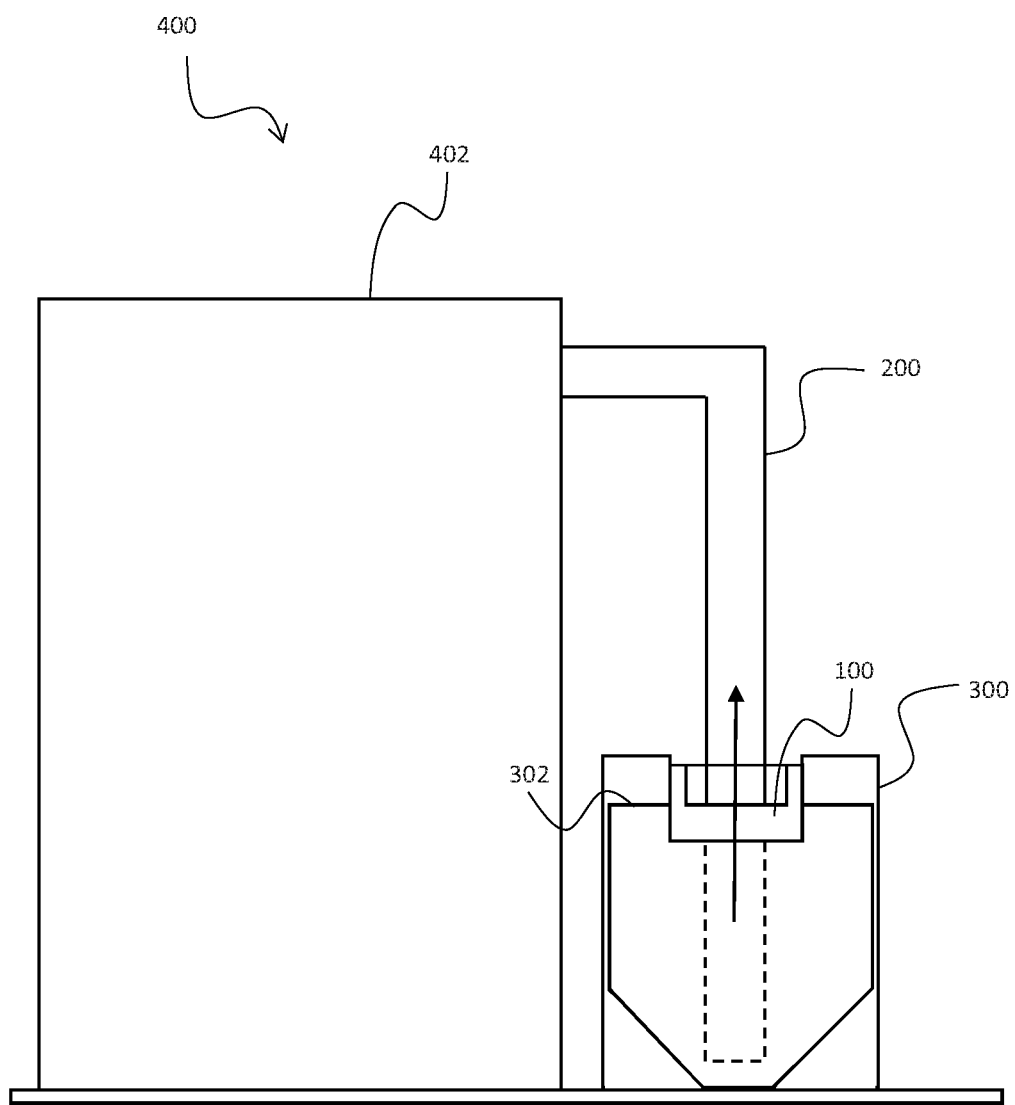
FIG. 1 is a schematic diagram showing an example arrangement of a 3D printing system including a build material container and a build material transport arrangement.

Three-dimensional (3D) objects can be generated using additive manufacturing techniques. The objects may be generated by solidifying portions of successive layers of build material. The build material can be powder-based and the properties of generated objects may be dependent upon the type of build material and the type of solidification. In some examples, solidification of the powder material is enabled using a liquid fusing agent. In further examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of outlet structures for build material containers which contain and deliver build material to the additive manufacturing process.

In one example the build material used in the additive manufacturing process of this disclosure is a powder that has an average volume-based cross-sectional particle diameter size of between approximately and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 80 microns using build material containers that contain powder having average volume-based particle diameters of between approximately 40 and approximately 60 microns. For example, the additive manufacturing apparatus can be reset to distribute different layer thicknesses.

Suitable powder-based build materials for use in example containers of this disclosure include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alumide, which may include a blend of aluminum and polyamide, multi-color powder, and plastics/ceramics blends. Blended build material may comprise two or more different respective average particle sizes.

A particular batch of build material for use in an additive manufacturing process may be "virgin" build material or "used" build material. Virgin build material should be considered to be build material which has not been used in any part of an additive manufacturing process, and/or which has not passed through any part of a 3D printing system. An unopened supply of build material as supplied by a build material manufacturer therefore contains virgin build material. By contrast, used build material is build material which has previously been supplied to a 3D printing system for use in an additive manufacturing process but not incorporated into a 3D printed article. In this respect, it will be understood that not all of the build material supplied to a 3D printing system for use in an additive manufacturing process may be used and/or incorporated into a 3D printed article. At least some of the unused build material supplied to a 3D printing system for use in an additive manufacturing process may be suitable for reuse in a subsequent additive manufacturing process. Such build material comprises used build material.

Some example outlet structures of this disclosure may facilitate reliable and convenient connection between a build material container and a build material supply system which transports the build material to a 3D printer. Some such example outlet structure may, for example, comprise features to ensure precise alignment between the outlet structure and a nozzle structure of the build material supply system. For example, the outlet structures may comprise features to ensure and retain a reliable connection between the outlet structure and the nozzle structure. Moreover, example outlet structures may comprise features to reduce build material loss or leakage, during operation and/or during a connection and/or disconnection procedure for the outlet structure and nozzle structure.

An example of a 3D printing system 400 is shown schematically in FIG. 1. The 3D printing system 400 comprises a 3D printer 402, a build material container 300 (hereinafter termed a "container") comprising an internal reservoir 302 (hereinafter termed a "reservoir") for holding build material, and a build material transport system 200 (hereinafter termed a "transport system") for transporting build material between the container 300 and the 3D printer 402. The 3D printing system 400 may be an additive manufacturing system for generating 3D objects using build material stored in the container 300. The 3D printer 402 may comprise a 3D printing part and a separate build material management part. Alternatively, the 3D printer 402 may comprise a 3D printing function and a build material management function incorporated within a single apparatus. The transport system 200 may comprise an aspiration system (not shown), which generates a suction pressure to extract build material from the container 300 for delivery to the 3D printer 402 by pneumatic transport. Connection between the transport system 200 and the container 300 is facilitated by a build material outlet structure 100 (hereinafter termed an "outlet structure") which provides an aspiration channel through which build material stored in the container 300 may be extracted or "aspirated" via the transport system 200 to the 3D printer 402. According to some examples, the transport system 200 is provided with a nozzle structure (not shown) to connect to the outlet structure 100 of the container 300 in a sealable manner (e.g. a gas/fluid seal), thereby facilitating pneumatic transport of the build material from the build material container 300 to the 3D printer 402.

Figure 2:
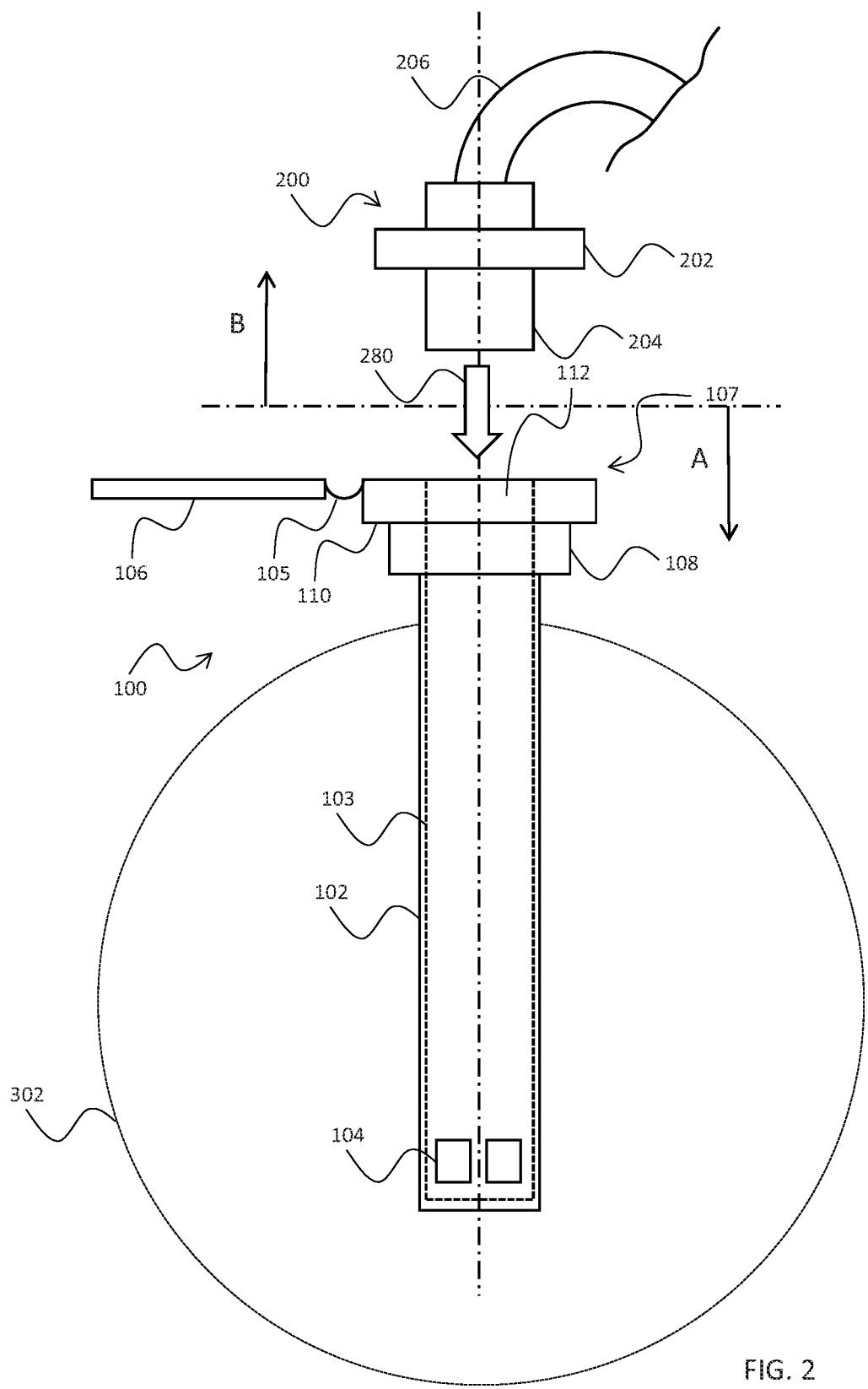
FIG. 2 is a schematic diagram showing an example of a build material outlet structure and an example of a nozzle structure of a build material transport system.

FIG. 2 is a schematic diagram illustrating an example of an outlet structure 100 of the container 300 shown in FIG. 1. In this example, the outlet structure 100 provides an aspiration channel 103 to extract build material from the reservoir 302 housed in the container 300 using a suction pressure generated by the aspiration system and applied to the outlet structure 100 via a detachable nozzle structure 202. The outlet structure 100 comprises a connector 107 comprising a first connector portion 108 and a second connector portion 110. The connector 107 is provided with outlet opening 112 to receive the nozzle structure 202 and guide the nozzle structure 202 to an engagement position with respect to the connector 107. The connector 107 and the nozzle structure 202 are configured to provide a substantially airtight connection to ensure that the suction pressure generated by the aspiration system is applied to the aspiration channel 103 to facilitate pneumatic transport of the build material from the reservoir 302.

In some examples, at least a part of the aspiration channel may be provided by a collect structure 102 which extends from the connector 107 of the outlet structure 100 into the reservoir 302 of the container 300. In some examples, the collect structure 102 may extend to an in-use bottom portion of the reservoir 302 to ensure efficient aspiration or extraction of build material from the container 300. In this respect, the collect structure 102 provides a conduit to focus the suction pressure generated by the aspiration system to a position within the reservoir 302 which ensures efficient collection and aspiration of build material.

The collect structure 102 may comprises a hollow tubular portion and one or more openings 104 positioned at a bottom end of the tubular portion. For example, the collect structure 102 may comprise a hollow cylindrical tube with a plurality of lateral openings 104 positioned at a bottom end of the cylindrical tube. When suction pressure is applied to the outlet structure 100 via the nozzle structure 202, build material is aspirated into the collect structure 102 via the lateral openings 104 and pneumatically transported to the transport system 200 through the aspiration channel 103 and the transport system 200.

In some examples, the outlet structure 100 may comprise a lid 106 to cover the connector 107 and outlet opening 112 during transport to prevent escape of build material from the container 300. The lid 106 is securable to the first connector portion 108 by an interference fit or any other suitable fastening means. FIG. 2 shows the lid 106 in an open position, attached to the second connector portion 110 by a flexible link element 105. In other examples, the lid 106 may be detachable from the second connector portion 110 for disposal or separate storage.

The transport system 200 comprises an aspiration hose 206 which is provided for pneumatic transport of build material from the nozzle structure 202 to the 3D printer 402. The nozzle structure 202 comprises a tube 204 which is configured to engage with the outlet opening 112 in the connector 107 by insertion in a generally downward direction shown by arrow 280 of FIG. 2. In an example, the tube 204 comprises an externally cylindrical wall which is complementary to an internal diameter of the outlet opening 112 to provide a substantially airtight engagement between the connector 107 and the nozzle 202 for the pneumatic transport of build material.

Figure 3:
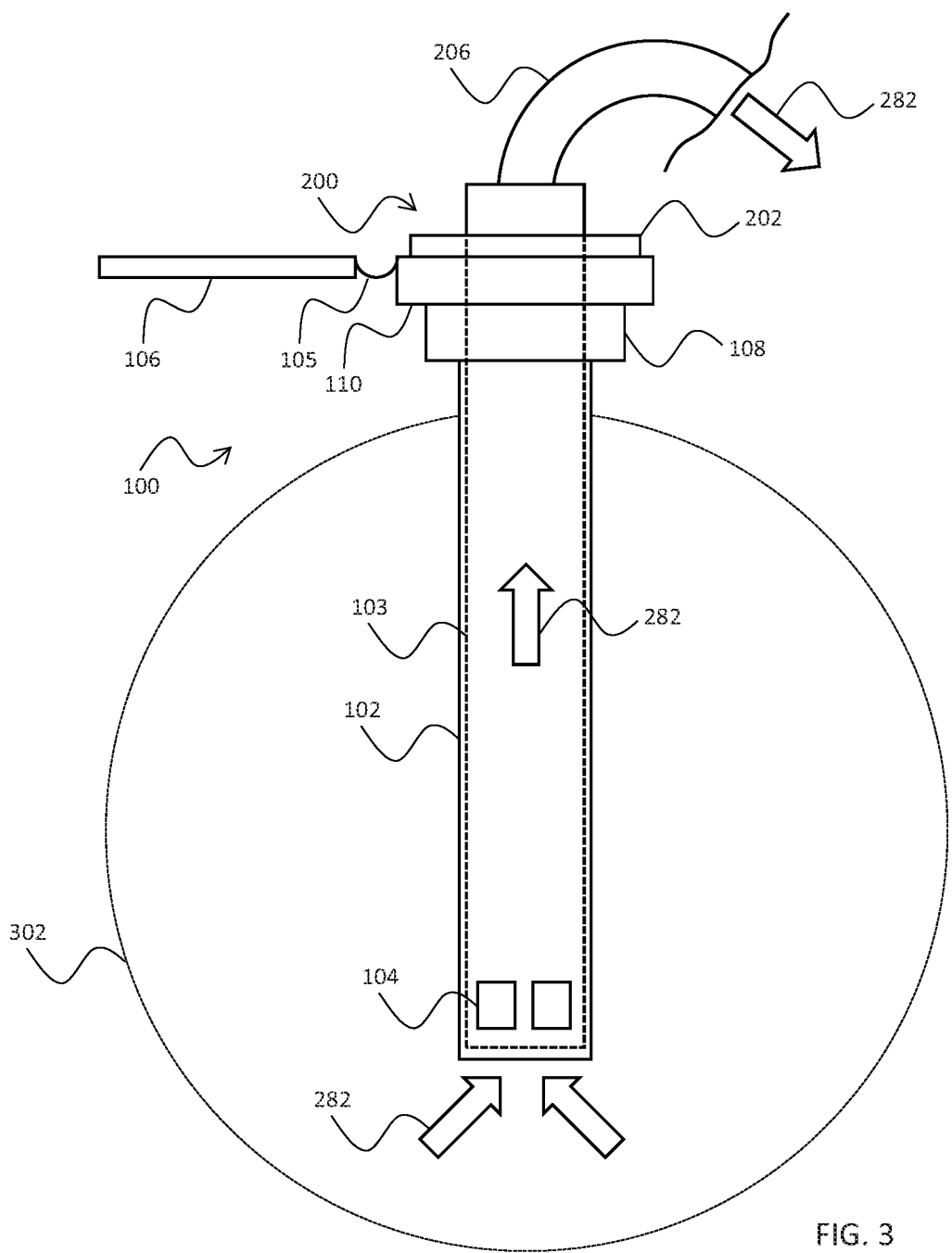
FIG. 3 is a schematic diagram showing an example of a build material outlet structure engaged with a build material nozzle structure of a build material transport system.

FIG. 3 is a schematic diagram showing the example outlet structure 100 and the example nozzle structure 202 of FIG. 2 in an engagement configuration. In this configuration, the outlet opening 112 of the connector 107 receives the tube 204 extending from the nozzle structure 202 to complete a substantially airtight engagement. This substantially airtight engagement enables the aspiration system to generate a suction pressure in the aspiration channel 103 to aspirate build material into the collect structure 102 for pneumatic transport to the 3D printer 402 via the aspiration channel 103, the nozzle structure 202 and the aspiration hose 206, as illustrated by arrows 282 of FIG. 3.

In some examples, the aspiration system comprises a pump, impeller or fan apparatus which is arranged to create the suction pressure in the aspiration hose 206 for the pneumatic transport of build material as discussed above. In this respect, the suction pressure represents a negative pressure differential between a pressure in the aspiration hose 206 and an internal pressure in the reservoir 302. In some examples, the internal pressure of the reservoir 302 does not substantially differ from the ambient pressure of the container 300. In other examples, the internal pressure of the reservoir may be lower than the ambient pressure of the container due, for example, to partial evacuation of air in the reservoir caused by the aspiration process. In this latter case, the aspiration system may be configured to regulate the pressure in the aspiration hose to maintain a specific negative pressure differential and ensure a substantively constant flow rate of build material from the reservoir to the 3D printing system 400.

Figure 4A:
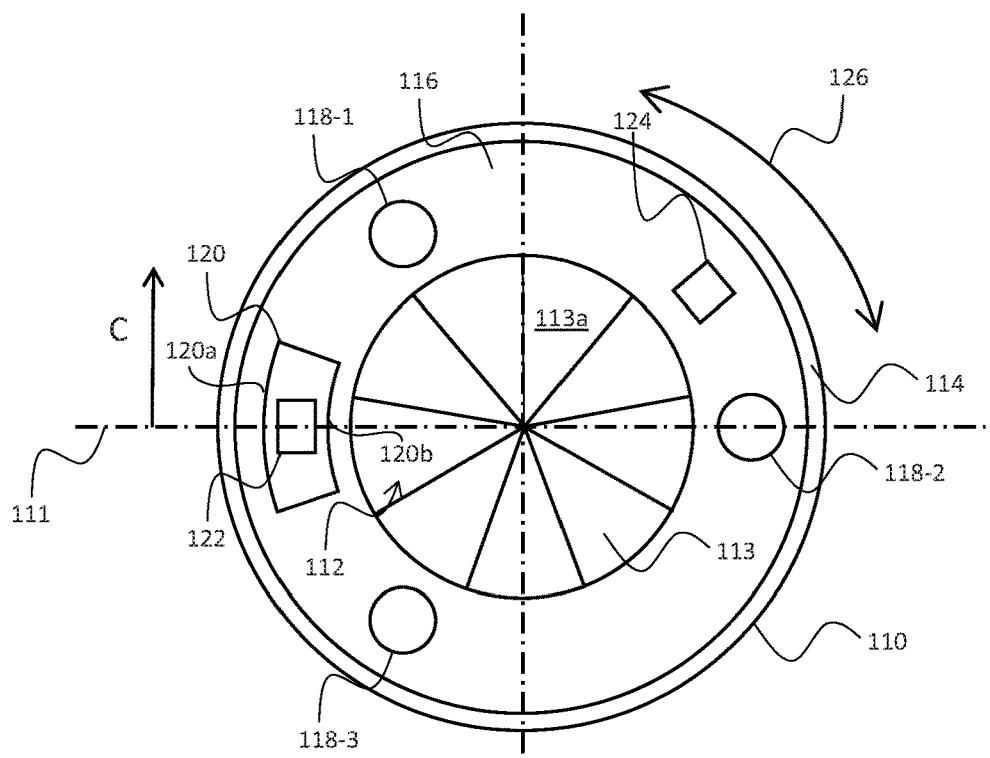
FIG. 4A is a schematic diagram showing a top view of an example build material outlet structure.

FIG. 4A is a schematic diagram illustrating a top view of the example outlet structure 100 in direction illustrated by arrow A of FIG. 2. Specifically, FIG. 4 shows a top view of the second connector portion 110 of the outlet structure 100 with the lid 106 removed for ease of explanation. In this example, the second connector portion 110 is substantially cylindrical and comprises an adaptor structure comprising one or more structural features to receive and/or engage the nozzle structure 202. For example, the adaptor structure may comprise a substantially planar interface surface 116 extending perpendicularly to the aspiration direction 280 illustrated in FIG. 3, and a circumferential wall 114 standing perpendicularly from an outer edge of the interface surface 116. The interface surface 116 may define the outlet opening 112 for receiving the tube 204 of the nozzle structure 202. The internal surface of the circumferential wall 114 may be complementary to an outer circumference of the nozzle structure 202, thereby functioning as a guide surface to guide the nozzle structure 202 into engagement with the interface surface 116 of the second connector portion 110.

The adaptor structure of the second connector portion 110 may also comprise a retaining structure 118 to releasably hold the nozzle structure 202 in an engagement position with respect to the interface surface 116 of the second connector portion 110. For example, the retaining structure 118 may comprise one or more retaining elements 118-1 to 118-3. In the present example the retaining elements 118-1 to 118-3 exert an attractive biasing force on the nozzle structure to releasably hold the nozzle structure 202 in the engagement position with respect to the second connector portion 110.

In a first example, at least one of the one or more retaining elements 118-1 to 118-3 may comprises a magnetisable retaining element (e.g. a ferromagnetic material) which responds to a magnetic field created by a complementary magnetic retaining element (e.g. a permanent magnet) disposed in the nozzle structure 202 to exert a magnetic biasing force on the complementary magnetic retaining element. In a second example, at least one of the one or more retaining elements 118-1 to 118-3 may comprise a magnetic retaining element (e.g. a permanent magnet) to produce a magnetic field which, when in the proximity of a complementary magenetisable retaining element (e.g. a ferromagnetic material) disposed in the nozzle structure 202, exerts a magnetic biasing force on the complementary magnetisable element. In a third example, at least one of the one or more retaining elements 118-1 to 118-3 may comprise a magnetic retaining element (e.g. a permanent magnet) to produce a magnetic field which, when in the proximity of a complementary magnetic retaining element of opposite polarity disposed in the nozzle structure 202, exerts a magnetic biasing force on the complementary magnetic element. In all three cases, the complementary pairings of magnetic and magnetisable or magnetic and magnetic retaining elements cooperate, when in relatively close proximity to one another, to produce an attractive biasing force which acts to releasably hold the nozzle structure 202 in the engagement position with respect to the second connector portion 110. According to these examples, the nozzle structure 202 and the second connector portion 110 may be released or separated from the engagement position by manually applying a separating force sufficient in magnitude to overcome the biasing force produced by the retaining elements 118-1 to 118-3. For example, the nozzle structure 202 may be provided with a handle (not shown) to facilitate manual application of this separation force. In these examples, it is not necessary for a user to operate any form of mechanical fastening means, thereby providing convenient engagement and disengagement of the nozzle structure 202 and the outlet structure 100.

It will be appreciated that, in operation, the suction pressure generated by the aspiration system may act to produce a biasing force to retain the nozzle structure 202 in the engagement position, exceeding that provided by the magnetic force provided by the plurality of retaining elements 118-1 to 118-3. In this respect, the magnetic force provided by the plurality of retaining elements 118-1 to 118-3 may be considered as guiding the nozzle structure 202 into the engagement position with respect to the outlet structure 100 prior to aspiration of the container 300, and the dominant retaining force once aspiration has been started is provided by the suction pressure generated by the aspiration system.

The use of complementary magnetic and magnetisable, or magnetic and magnetic retaining elements ensures that retaining structure 118 remains effective when operating in a powder-based build material environment. That is, the attractive biasing force provided by the retaining structure 118 is unaffected by possible powder buildup on the surface of the connector 107 and/or the nozzle structure 202. In contrast, mechanical means for retaining the nozzle structure 202 and the outlet structure 100 in the engagement position may become dysfunctional or less effective due to clogging or sticking associated with buildup of the powder based build material.

In some examples, the second connector portion 110 and the nozzle structure 202 may be formed or partially formed from a non-magnetisable material, such as a plastic material. In such embodiments, the plurality of retaining elements 118-1 to 118-3 provide an additional alignment function by urging the nozzle structure 202 a particular orientation with respect to the second connector portion 110. In further examples, the plurality of retaining elements 118-1 to 118-3 may urge the nozzle structure 202 into a particular orientation in a plurality of possible orientations defined by the particular arrangement and/or number of retaining elements 118-1 to 118-3, depending on the initial alignment of the nozzle structure 202 with respect to the second connector portion 110.

In some examples, the number of retaining elements 118-1 to 118-3 disposed in the connector 107 may be more or fewer than the number of retaining elements 210-1 to 210-3 disposed in the nozzle structure 202. For example, the connector 107 may comprise a single retaining element which is complementary to a plurality of retaining elements 210-1 to 210-3 disposed in the nozzle structure 202. Thus, in the present context, it will be understood that the term "complementary" does not necessarily imply a one-to-one relationship between the retaining elements in the connector 107 and the nozzle structure 202 respectively.

It will be understood that the term "magnetisable material" encompasses any material which exhibits the properties of a magnetic when subject to or located in an external magnetic field. Thus, this term encompasses ferromagnetic materials such as alloys of iron (e.g. steel), nickel and/or cobalt. Thus, in the context of the present disclosure a "magnetisable retaining element" refers to a retaining element which is magnetic when located in the magnetic field of a complementary "magnetic retaining element", thereby producing the equal and opposite magnetic attractive biasing force discussed above.

In some examples, the one or more retaining elements 118-1 to 118-3 are disposed an annular region of the second connector portion 110 which is coaxial with the outlet opening 112. The annual regional may be proximate to the outlet opening 112. The one or more retaining elements 118-1 to 118-3 may be circumferentially distributed in the annular region to provide a relatively even distribution of the attractive biasing force between the connector 107 and the nozzle structure 202. The one or more retaining elements 118-1 to 118-3 may be retained in respective pockets which are recessed from the interface surface 116 of the second connector portion 110. In the example shown in FIG. 4A, the retaining elements 118-1 to 118-3 comprise a leading surface which is coplanar with the interface surface 116 of the second connector portion 110. Alternatively, the one or more retaining elements 118-1 to 118-3 may be disposed in the second connector portion 110 under the interface surface 116, such that they are not visible externally from the outlet structure 100.

The second connector portion 110 may be rotatably connected to the first connector portion 108 to enable relative rotation of the second connector portion 110 with respect to the first connector portion 108 in the directions shown by arrow 126 of FIG. 4A. In some examples, this relative rotation may be provided in a plane perpendicular to the aspiration channel shown by arrow 282, and substantially coplanar with interface surface 116. This relative rotation enables a user to rotate the second connector portion 110 to a predetermined or convenient orientation. For example, the second connector portion 110 may be rotated to align the adaptor structure with an orientation of the nozzle structure 202, thereby ensuring that the nozzle structure 202 can engage with the adaptor structure without requiring reorientation of the container 300 and/or nozzle structure 202. Similarly, the second connector portion 110 may be rotated to position the lid 106 in a particular orientation with respect to particular structural features of the container 300. For example, the second connector portion 110 may be rotated to an orientation which ensures that the lid 106 can be opened to an open configuration and stowed without interference from structural features of the container 300 such as vent structures or other openings (not shown). This rotation of the second connector portion 110 with respect to the first connector portion 108 may be considered as providing a "primary" or "coarse" alignment mechanism for the outlet structure 100. This primary alignment mechanism may, for example, address any variations in alignment between the first connector portion 108 and the container 300 introduced, for example, during assembly of the container 300 and outlet structure 100.

In some examples, the outlet structure 100 may be provided with a non-transitory computer readable storage medium (not shown), such as an embedded smart chip, for storage of data relating to use of the container 300. For example, the non-transitory computer readable storage medium may store data which is usable by the 3D printer 402 to ensure safe operation and usage of the container 300 and the build material stored therein. To facilitate data communication between the 3D printer 402 and the non-transitory computer readable storage medium, the second connector portion 110 may include a socket 120 recessed into the second connector portion 110 from the interface surface 116, to receive a data interconnect structure 212 protruding or extending from a leading face of the nozzle structure 202. The socket 120 may be provided with one or more data contacts 122 disposed in a bottom portion of the socket 120 to engage a data interface 213 of the data interconnect 212 to provide a data connection between the outlet structure 100 and the nozzle structure 202. This data connection may, for example, be used to transfer data to and from the non-transitory computer readable storage medium and the 3D printer 402 as described above.

In some examples, the socket 120 may be disposed in the annular region of the interface surface comprising the plurality of retaining elements 118-1 to 118-3. Further, the socket 120 may be located in an area of the annular region which is substantially opposite a particular retaining element in the plurality of retaining elements 118-1 to 118-3. In some examples, the socket 120 and the particular retaining element may be located on an axis 111 which is aligned with one or more particular features of the container 300. For example, the axis may be substantially parallel with a side wall of the container 300.

In some examples, the socket 120 may also function as an alignment socket to provide alignment of the nozzle structure 202 with respect to the second connector portion 110. In this respect, the socket 120 may comprise one or more alignment surfaces which are configured to guide the data interconnect structure 212 into a correct position within the socket 120. For example, the one of more alignment surfaces may be internal alignment surfaces configured converge towards the bottom of the socket 120 to guide or urge the data interface 213 into correct engagement with the one or more data contacts 122. In examples where relative rotation between the first connector portion 108 and the second connector portion 110 is provided in the manner described above, the alignment provided by the socket 120 may be considered as providing a "secondary" or "fine" alignment mechanism, ensuring precise engagement between the data interface 213 and the one or more data contacts 122, and therefore facilitate reliable data transfer to and from the non-transitory computer readable storage medium.

The socket 120 may comprise a substantially curved outer wall 120a and a substantially curved inner wall 120b as shown in FIG. 4A. In some examples, one or both of the outer wall 120a and the inner wall 120b may be substantially concentric with the circumferential wall 114 of the adaptor to assist insertion of the data interconnect structure 212 into the socket 120 by rotation of the nozzle structure 202 within the circumferential wall 114 of the adaptor. In some examples, a tangent of the outer wall 120a and/or the inner wall 120b may be substantively parallel to a side wall of the container 300.

In some examples, the nozzle structure 202 is provided with an activation switch 214, such as a micro switch, which is actuated when the nozzle structure 202 is in a correct engagement position with respect to the outlet structure 100. The 3D printer 402 may monitor the state of the activation switch 214 to regulate aspiration of the container 300 and control data transfer between to and from the non-transitory computer readable medium embedded the outlet structure 100. For example, the 3D printer 402 may monitor the state of the activation switch to ensure that aspiration of the container is only performed when correct engagement between the nozzle structure 202 and the outlet structure 100 has been confirmed by actuation of the activation switch 214. In this manner, undesirable expulsion of build material from the container 300 into the surrounding environment due to incomplete or imperfect engagement between the nozzle structure 202 and the outlet structure 100 can be avoided or reduced. Similarly, the 3D printer 402 can ensure that data transfer to and from the non-transitory computer readable medium via the data interface 213 is only performed when correct engagement between the nozzle structure 202 and the outlet structure 100, and thus correct engagement between the data interface 213 and the one or more data contacts 122 has been confirmed. In this manner, data loss due to incorrect engagement between the data interface 213 and the one or more data contacts 122 can be avoided.

Mechanical activation of the activation switch 214 may be provided by an activation structure 124, such as a protrusion, which extends or is raised from the interface surface 116 of second connector portion 110. The activation structure 124 is located at a position on the interface surface 116 which is complementary to the position of the activation switch 214 disposed in the nozzle structure 202. Thus, when the nozzle structure 202 is brought into correct engagement with the outlet structure 100, the activation structure 124 engages and mechanically activates the activation switch 214.

In some examples, the socket 120 is disposed in the annular region between a first retaining element in the plurality of retaining elements 118-1 to 118-3 and a second retaining element in the plurality of retaining elements 118-1 to 118-3, and the activation structure 124 is disposed in the annular region between the second retaining element in the plurality of retaining elements 118-1 to 118-3 and a third retaining element in the plurality of retaining elements 118-1 to 118-3.

In some examples, the height of the activation structure 124 is selected to ensure that the activation switch 214 is released or disengaged before the data interface 213 disengages from the data contacts 122 disposed in the socket 120. This enables the 3D printer 402 to stop data transfer between the nozzle structure 202 and the outlet structure 100 and avoid potential data loss suffered, due to unexpected disconnection between the data interface 213 and the data contacts 122. For example, the activation structure 124 may be configured to engage the activation switch 214 in the nozzle structure 202 for a first predetermined range of displacement of the nozzle structure 202 from the engagement position, and the one or more data contacts 122 may be configured to engage the data interface 213 for a second predetermined range of displacement of the nozzle structure 202 from the engagement position, wherein the second predetermined range of displacement is greater than the first predetermined range of displacement. This ensures that the activation switch 214 is deactivated or disengaged before the data interface 213 disengages from the data contacts 122 disposed in the socket 120.

The retaining means 118 may be configured to provide an attractive biasing force which is sufficient to mechanically activate the activation switch 214. For example, the complementary retaining elements in the connector 107 and the nozzle structure 202 may be configured such, when the nozzle structure 202 is within a predetermined separation distance from the interface surface 116 of the second connector portion 110, the magnetic force is sufficient to pull or urge the nozzle structure 202 into the engagement position and mechanically activate the activation switch 214. In some examples, the predetermined separation distance may be equal to or greater than the height of the activation structure 124.

According to some examples, the outlet structure 100 may further comprise a respective valve structure 113 to reduce loss of build material during the engagement and disengagement process. Details of the valve structure 113 are disclosed below with reference to FIGS. 7 and 8.

Figure 4B:
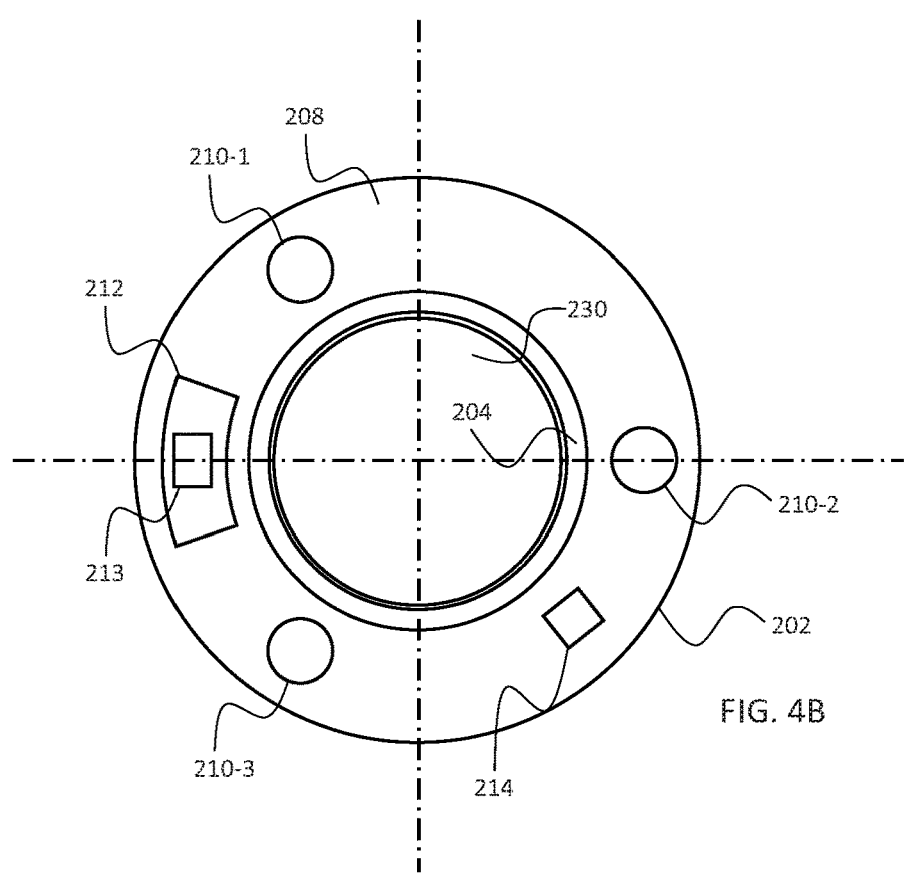
FIG. 4B is a schematic diagram showing a bottom view of an example build material nozzle structure.

FIG. 4B is a schematic diagram illustrating a bottom view of the nozzle structure 202 in direction illustrated by arrow B of FIG. 2. The nozzle structure 202 comprises a circumferential tube 204 which extends perpendicularly from an interface surface 208 of the nozzle structure 202. The nozzle structure 202 further comprises a retaining structure 210 to releasably hold the nozzle structure 202 in the engagement position with respect to the interface surface 116 of the second connector portion 110. For example, the retaining structure 210 may comprise one or more retaining elements 210-1 to 210-3 which are disposed in the nozzle structure 202 in positions which are complementary to the corresponding retaining elements 118-1 to 118-3 disposed in the second connector portion 110.

As discussed above with reference to FIG. 4A, at least one of the one or more retaining elements 210-1 to 210-3 of the nozzle structure 202 may comprise a magnetisable retaining element (e.g. a ferromagnetic material) which responds to a magnetic field created by a complementary magnetic retaining element (e.g. a permanent magnet) disposed in the second connector portion 110 to exert an magnetic biasing force on the complementary magnetic retaining element. In a second example, at least one of the one or more retaining elements 210-1 to 210-3 may comprises a magnetic retaining element (e.g. a permanent magnet) to produce a magnetic field which, when in the proximity of a complementary magenetisable retaining element (e.g. a ferromagnetic material) disposed in the second connector structure 110, exerts a magnetic biasing force on the complementary magnetisable element. In a third example, at least one of the one or more retaining elements 210-1 to 210-3 may comprises a magnetic retaining element (e.g. a permanent magnet) to produce a magnetic field which, when in the proximity of a complementary magnetic retaining element of opposite polarity disposed in the second connector structure 110, exerts a magnetic biasing force on the complementary magnetic element. In all three cases, the complementary pairings of magnetic and magnetisable, or magnetic and magnetic retaining elements cooperate, when in relatively close proximity to one another, to produce an attractive biasing force which acts to releasably hold the nozzle structure 202 in the engagement position with respect to the second connector portion 110. According to these examples, the nozzle structure 202 and the second connector portion 110 may be released or separated from the engagement position by manually applying a separating force sufficient in magnitude to overcome the biasing force produced by the retaining elements. For example, the nozzle structure 202 may be provided with a handle to facilitate manual application of this separation force. In these examples, it is not necessary for a user to operate any form of mechanical fastening means, thereby providing convenient engagement and disengagement of the nozzle structure 202 and the outlet structure 100.

In some examples, the one or more retaining elements 210-1 to 210-3 are disposed an annular region of the nozzle structure 202 which is coaxial with the tube 204. The annual region may be proximate to the tube 204. The one or more retaining elements 210-1 to 210-3 may be circumferentially distributed in the annular region to provide a relatively even distribution of the attractive biasing force between the connector 107 and the nozzle structure 202. The one or more retaining elements 210-1 to 210-3 may be retained in respective pockets which are recessed from the interface surface 208 of the second nozzle structure 202. In the example shown in FIG. 4B, the retaining elements 210-1 to 210-3 comprise a leading surface which is coplanar with the interface surface 208 of the nozzle structure 202. Alternatively, the one or more retaining elements 210-1 to 210-3 may be disposed in the nozzle structure 202 under the interface surface 208 such that they are not visible externally from the nozzle structure 202.

According to some examples, the nozzle structure 202 may further comprise a valve structure 230 to reduce loss of build material during the engagement and disengagement process. Details of the valve structure 230 are disclosed below with reference to FIGS. 7 and 8.

Figure 5:
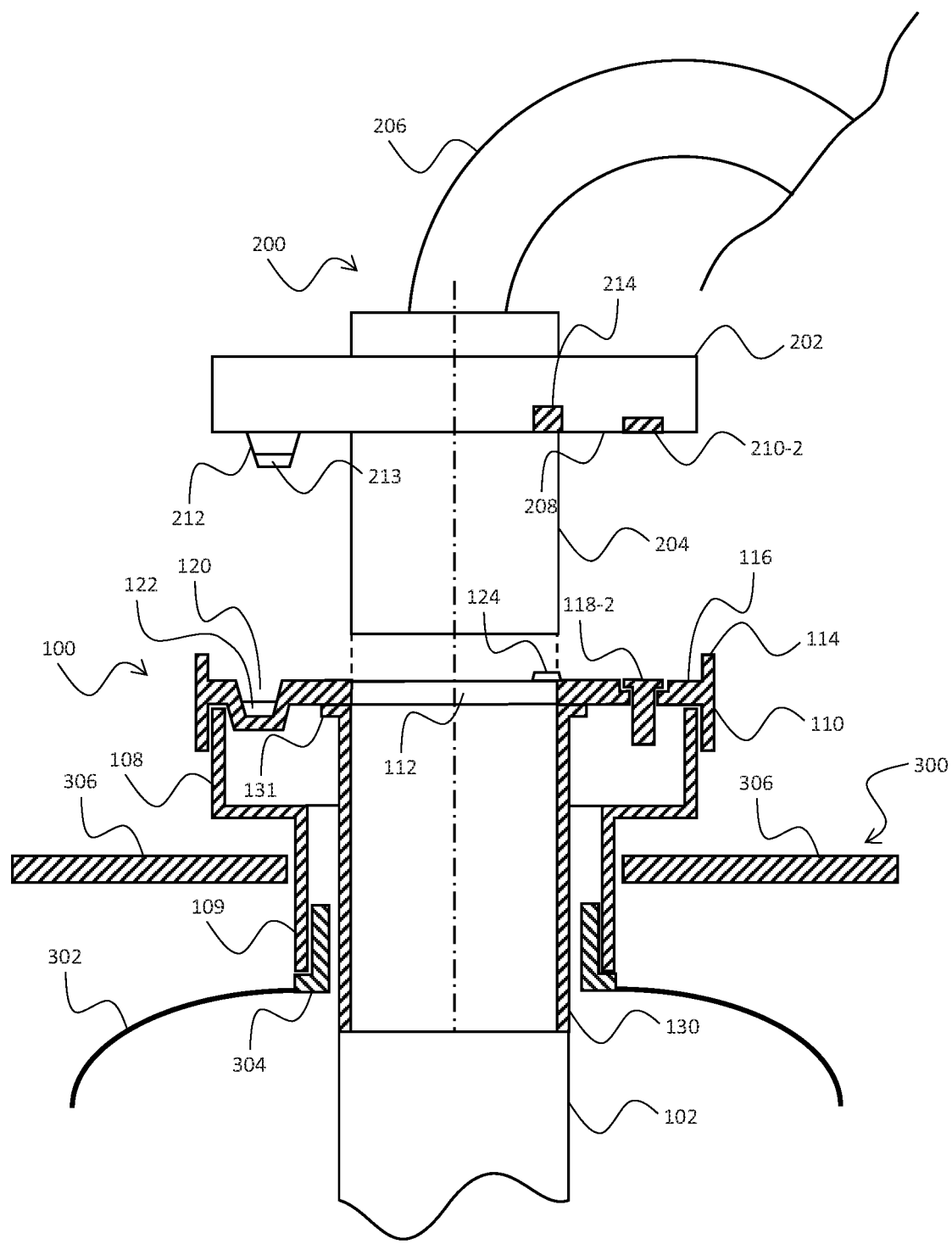
FIG. 5 is a schematic diagram showing a partially sectioned view of an example build material outlet structure and an example nozzle structure.

FIG. 5 is a schematic diagram showing a partially sectioned view of the outlet structure 100 of FIG. 4A, viewed in the direction of arrow C of FIG. 4A. In addition to the features discussed above with reference to FIGS. 4A and 4B, FIG. 5 shows an example of the interface between the outlet structure 100 and the container 300. In this example, the outlet structure 100 is inserted through an upper wall 306 of the container 300 to connect to the reservoir 302 housed therein. In particular, the first connector portion 108 of the outlet structure engages a neck portion 304 of the reservoir 302 to provide a substantially airtight seal between the outlet structure 100 and the reservoir 302. For example, the first connector portion 108 may include a cylindrical wall 109 which engages the neck portion 304 of the reservoir 302 in an interference fit to provide the substantially airtight seal. Alternatively, the cylindrical wall 109 of the first connector portion 108 may be provided with an internal thread (not shown) on an inner wall of the cylindrical portion, which is complementary to and engages with an external thread (not shown) on an outer wall of the neck portion 304. In an alternative example, the cylindrical wall 109 of the first connector portion 108 may be provided with an external thread (not shown) on an outer wall of the cylindrical portion, which is complementary to and engages with an internal thread (not shown) on an inner wall of the neck portion 304. In each example, the outlet structure 100 may be conveniently connected to and disconnected from the reservoir by screwing or unscrewing the first connector portion 108 relative to the neck portion 304.

According to the example illustrated in FIG. 5, the outlet structure 100 may also comprises a tube portion 130 which extends from a bottom surface of the second connector portion 110 of the outlet structure towards the neck portion 304 of the reservoir 302. In some examples, the tube portion 130 may pass through the neck portion 304 into reservoir 302. In the example illustrated in FIG. 5, the tube portion 130 is provided to connect to the collect structure 102 shown in FIGS. 2 and 3, and provides an upper section of the aspiration channel 103. Alternatively, the tube portion 130 may be an integral part of the collect structure 102 and extend to bottom area of the reservoir 302 as discussed above. In the example illustrated in FIG. 5, the tube portion 130 comprises a flange portion 131 which connects to the bottom surface of the second connector portion 110. The flange portion 131 may be secured to the second connector portion 110 using any suitable securing means, such as glue or screw fasteners. Alternatively, the tube portion 130 may be an integral part of the second connector portion 110, in which case the flange portion 131 may not be required. In both cases, the tube portion 130 is substantially coaxial with the outlet opening 112 of the second connector portion 110 to receive the tube 204 of the nozzle structure 202 for the pneumatic transport of build material from of the reservoir 302.

As discussed above with reference to FIGS. 4A and 4B, the second connector portion 110 is provided with a socket 120 which is recessed from the interface surface 116 to receive a data interconnect structure 212 protruding from the nozzle structure 202. This relationship is further illustrated in FIG. 5, which shows the complementary positions of the socket 120 and the data interconnect structure 212 in the second connector portion 110 and the nozzle structure 202 respectively. In this example, the socket 120 comprises side walls which converge towards the bottom of the socket 120, thereby acting as alignment surfaces to guide or urge the data interconnect structure 212 into a correct position within the socket 120.

FIG. 5 also shows the complementary positions for the activation switch 214 and the activation structure 124 of the nozzle structure 202 and the second connector portion 110 respectively. Similarly, FIG. 5 shows the complementary positions of a retaining element 118-2 disposed in the second connector portion 110 and a retaining element 210-2 disposed in the nozzle structure 202. In the example shown in FIG. 5, the retaining element 118-2 disposed in the second connector portion 110 is located or seated in a pocket, which is explained in further detail below with respect to FIGS. 6A and 6B.

Figure 6A:
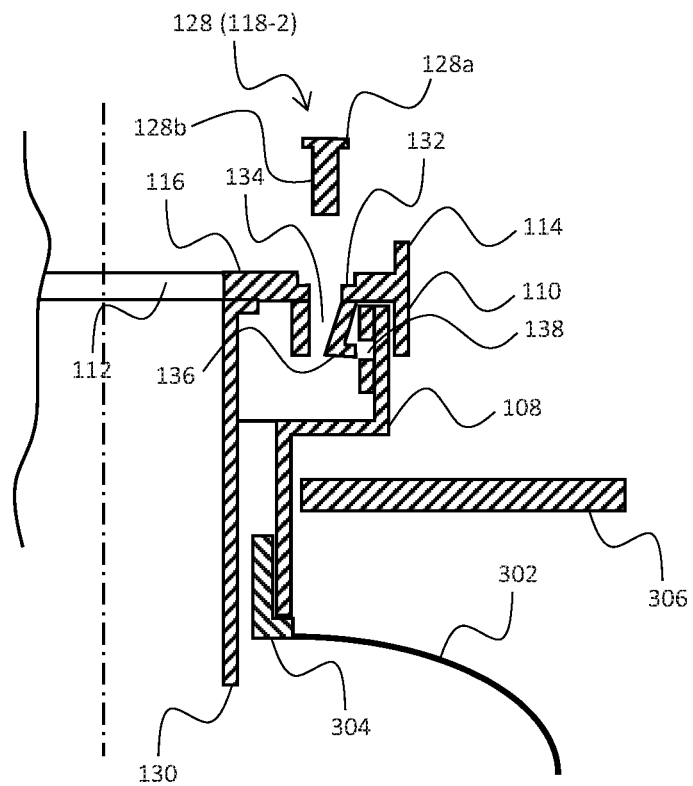
FIG. 6A is a schematic diagram showing a sectioned view of an example build material outlet structure in an unlocked arrangement.
Figure 6B:
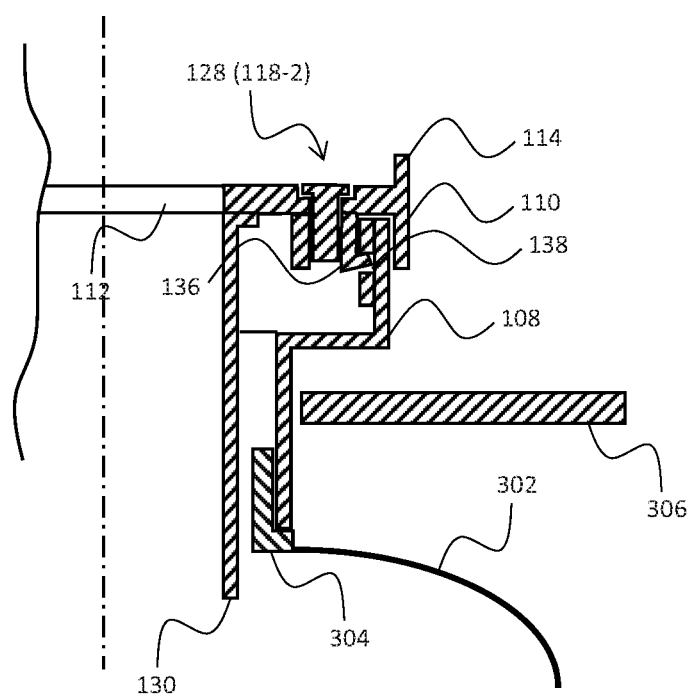
FIG. 6B is a schematic diagram showing a sectioned view of an example build material outlet structure in a locked arrangement.

FIGS. 6A and 6B show an example of a locking mechanism for the first connector portion 108 and the second connector portion 110. In this example, the locking mechanism comprises a locking member 128 comprising a substantially cylindrical portion, a latching member 136 and a latching surface 138 which cooperate to secure the first connector portion 108 to the second connector portion 110. According to this example, the functionality of the locking member 128 is provided conveniently by retaining element 118-2 which takes the form of a screw or bolt comprising a head portion 128a and a stem portion 128b. The head portion 128a of the locking member 128 is received into a complementary pocket 132 which is recessed into the second connector portion 110 from the interface surface 116. The stem portion 128b of the locking member 128 is received into a cavity 134 which extends downward from an orifice in a bottom surface of the pocket 132. The diameter of the head portion 128a may be selected to correspond to the diameter of the complementary pocket 132. For example, the diameter of the head portion may be 8, 10 or 12 millimeters as appropriate.

The cavity 134 may comprise one or more side walls which are integral to the second connector portion 110 and stand adjacent to stem portion 128b of the locking member 128 when it is located in the cavity 134. In particular, at least one of the side walls functions as a latching member 136 which is configured to engage a latching surface 138 of the first connector portion 108. The latching member 136 is formed from a resilient material and at least part of the latching member 136 extends into the cavity 134, such that when the locking member 128 is seated in the cavity, the latching member 136 is displaced outwardly from the cavity 134 to engage the latching surface 138 of the first connector portion.

The engagement between the latching member 136 of the second connector portion 110 and the latching surface 138 of the first connector portion 108 is configured to oppose or resist separation of the first connector portion 108 and the second connector portion 110. For example, the latching surface 138 may be provided by a circumferential groove in an internal wall of the first connector portion 108 as shown in FIGS. 6A and 6B. The circumferential groove may span the whole circumference of the internal wall or may span a portion of the circumference of the internal wall (i.e. an arc of the internal wall). In this example, the latching member 136 may be free to move circumferentially within the circumferential groove, thereby permitting relative rotation between the first connector portion 108 and the second connector portion 110, whilst opposing separation. Alternatively, the friction between the latching member 136 and the latching surface 138 may be sufficient to oppose relative rotation between the first connector portion and the second connector portion. In further examples, the latching surface 138 may be provided by a notch or indentation in the internal wall of the first connector portion 108, thereby preventing relative rotation and separation of the first connector portion 108 and the second connector portion 110. In some examples, the internal wall of the first connector portion 108 may be provided with a plurality of notches, thereby allowing the second connector portion 110 to be locked in a plurality of respective orientations relative to the first connector portion 108.

FIG. 6A shows an example of the locking mechanism prior to insertion of the locking member 128 into the cavity 134 to displace the latching member 136. In particular, FIG. 6A shows latching member 136 extending partially into the cavity 134, such that it is disengaged from the latching surface 138 of the first connector portion 108. When the locking member 128 is inserted into the cavity, the stem 128b of the locking member 128 displaces the latching member 136 from the cavity and pushes or drives the latching member 136 into engagement with the latching surface 138 of the first connector portion 108, as shown in FIG. 6B.

The locking member 128 may take the form of a screw or a bolt comprising an external thread. In such examples, the side walls of the cavity may provide an interference fit to the locking member 128, such that the external thread of the locking member 128 can penetrate and grip the side walls to ensure that the locking member 128 is retained in the cavity. Alternatively, the locking member 128 may be retained in the cavity by virtue of the interference fit alone, or using any other suitable retaining means such as glue.

As discussed above, the retaining elements 118-1 to 118-3 may also function as locking members as illustrated in FIGS. 6A and 6B. In such examples, at least the head portion 128a of the locking member 128 is formed from a magnetic material or a magnetisable material to provide the releasable engagement discussed above with reference to FIGS. 4A and 4B. In this manner, the total number of parts and time required for assembly of the connector outlet structure 100 is reduced.

Although FIGS. 6A and 6B illustrate only one locking member 128 and corresponding cavity 134, it will be understood that a plurality of locking members 128 and respective cavities 134 may be provided. For example, each of the plurality of retaining elements 118-1 to 118-3 illustrated in FIG. 4A may also function as a locking member 128 in the manner described above with reference to FIGS. 6A and 6B.

Figure 9:
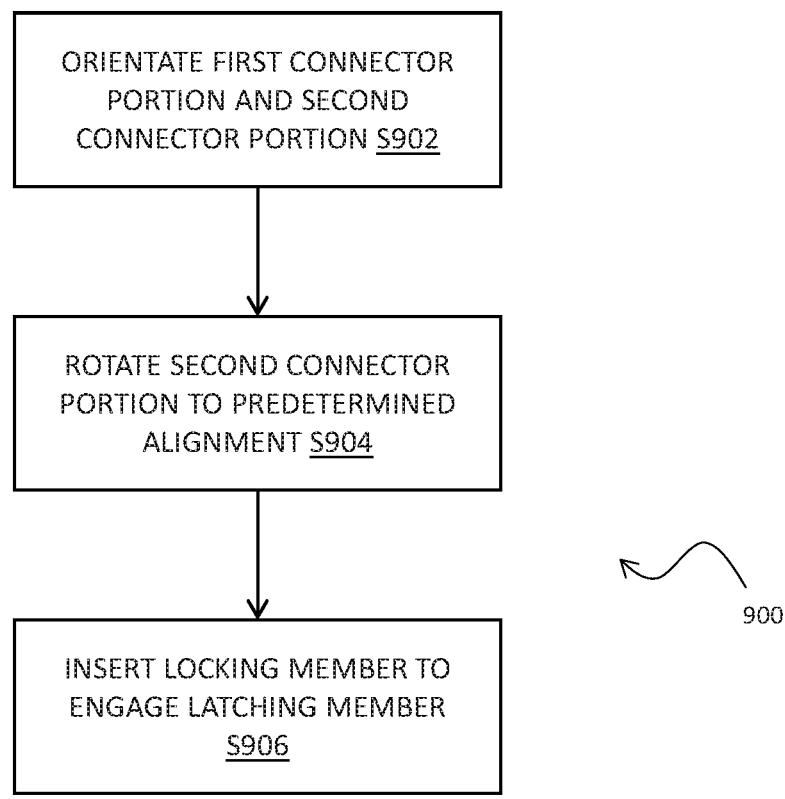
FIG. 9 is a flow diagram showing an example of a method of assembling a build material outlet structure.

FIG. 9 is a flow diagram showing a method 900 for assembling the connector 7 discussed above with reference to FIGS. 6A and 6B. In a first step a user orientates the first connector portion 108 and the second connector portion 110 in the arrangement shown in FIG. 6A (step S902). Next, the user rotates the second connector portion 110 to a preferred or desired alignment with respect to the first connector portion 108 (step S904). Finally, the user inserts the locking member 128 into respective cavity 134 to displace the latching member 136 from the cavity to engage the latching surface 138 (step S906). According to some examples, steps S902 and S904 may be combined to provide orientation and rotation in a single step (e.g. in an assembly line) such that separate alignment of the second connector is not required.

Figure 7:
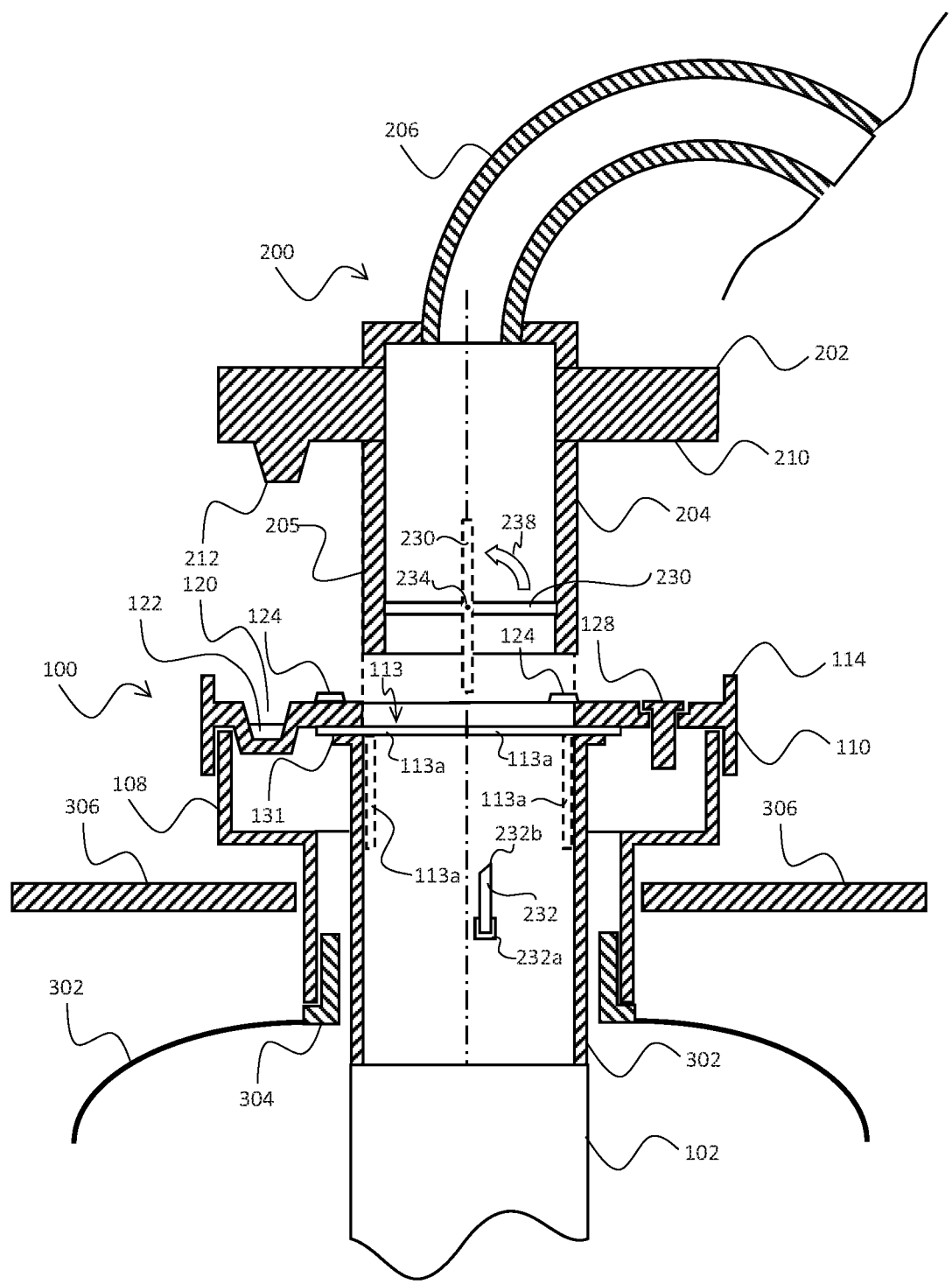
FIG. 7 is a schematic diagram showing a partially sectioned view of an example of a sealing arrangement for a build material outlet structure and a build material nozzle structure.
Figure 8:
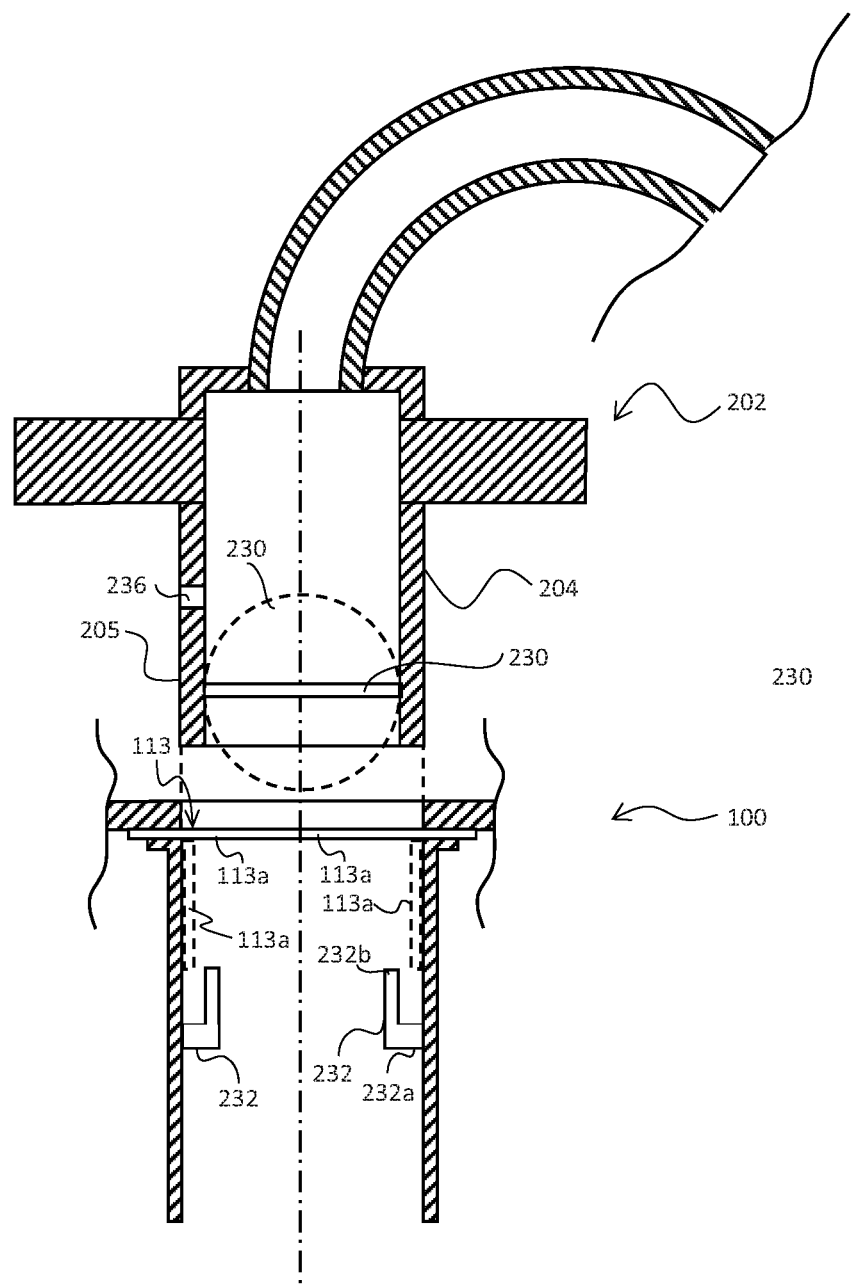
FIG. 8 is a schematic diagram showing a partially sectioned view of an example sealing arrangement for a build material outlet structure and a nozzle structure.

FIGS. 7 and 8 show a partially sectioned view of an example of a sealing arrangement for a build material outlet structure 100 and a build material nozzle structure 202. FIGS. 7 and 8 are similar to FIG. 5, except that they also show an example valve element 230 of the nozzle structure 202, and an example valve element 113 and protrusions 232 of the outlet structure 100. FIG. 8 shows a view rotated through 90 degrees as compared to FIG. 7, with some features not shown for clarity.

Referring to FIGS. 7 and 8, in some examples, the nozzle structure 202 comprises a valve element 230 at or near an end portion 205 of the tube 204. The valve element 230 is arranged to change from a first configuration (shown with solid lines in FIGS. 7 and 8) to close the end portion 205 of the tube 204 to a second configuration (shown with broken lines in FIGS. 7 and 8) to open the end portion 205 of the tube 204 on insertion of the end portion 205 of the tube 204 into the outlet structure 100 of the 3D build material container 300. It will be appreciated that, for clarity, FIGS. 7 and 8 do not show the end portion 205 of the tube 204 inserted into the outlet structure 100, but that the configurations of the valve element 230 of the nozzle structure 202 and the valve element 113 of the outlet structure 100 shown in broken lines in FIGS. 7 and 8 are shown as if the end portion 205 of the tube 204 were inserted into the outlet structure 100. The second (open) configuration may allow air flow and/or build material to pass through the tube 204 for pneumatic transport of build material through the tube 204. The first (closed) configuration may restrict and/or prevent air flow and/or build material from passing through the tube 204, and hence may prevent spillage of build material from the tube 204.

In some examples, the valve element 230 is arranged to change from the second (open) configuration to the first (closed) configuration on removal of the end portion 205 of the tube 204 from the outlet structure 100. This may prevent spillage of the build material when the nozzle structure 202 is removed from the outlet structure 100 of the build material container 300.

For example, the valve element 230 may be arranged to be changed from the first (closed) configuration to the second (open) configuration by a protrusion 232 of the outlet structure 100, as explained in more detail below. This may allow for the configuration to be automatically changed from the first (closed) to the second (open) configuration on insertion of the tube 204 into the outlet structure 100.

In some examples, the valve element 230 is biased towards the first (closed) configuration. This may allow for automatic (i.e. default) closing of the valve element 230 when the nozzle structure 202 is removed from the outlet structure 100. This may allow for automatic prevention of spillage of build material from the tube 204 whenever the nozzle structure 202 is not received in the outlet structure 100 of the container 300. The valve element may be biased towards the first (closed) configuration using any suitable biasing element (not shown), for example, one or more resilient members (e.g. springs), one or more biasing weights, and/or one or more magnetic elements.

In some examples, the valve element 230 is pivotally mounted at or near the end portion 205 of the tube 204 and pivotable about a first axis 234 between the first (closed) configuration and the second (open) configuration in the direction shown by arrow 238 of FIG. 7. The first axis 234 is perpendicular to a length of the tube 204. The nozzle structure 202 may comprise one or more mounting elements (not shown) for pivotally mounting the valve element 230 within or at the end of the tube 204. For example, the valve element 230 may be a circular disk and the tube 204 may be a hollow cylinder. Two axles (not shown) may extend outwardly on opposite edges of the disk, which axles respectively engage into and are free to rotate within two mounting elements (not shown) mounted at opposite sides within the tube 204. The mounting elements (not shown) therefore hold, via the axels, the disk within the tube 204, and allow the disc to pivot about a first axis 234 defined by the two mounting elements (not shown). The mounting elements may comprise stopping elements (not shown) to restrict the range of pivoting of the valve element 230 within the tube 204, for example, to restrict the range of pivoting between the first (closed) and second (open) configuration.

In some examples, the nozzle structure 202 comprises a biasing element (not shown), for example a resilient member (e.g. a hair spring) to bias the valve element 230 towards the first (closed) configuration. For example, one end of the hair spring may be in mechanical contact with the tube 204, and the other end of the hair spring may be in mechanical contact with the valve element 230, and the hair spring may be arranged so as to bias (urge) the valve element 230 to the first (closed) configuration, i.e. so that the circumference of the disk is flush or near flush with the inner surface of the tube 204.

In some examples, the first axis 234 about which the valve element 230 pivots may be offset from a center of mass of the valve element 230. For example, the mass of the valve element 230 at one side of the first axis 234 may be larger than the mass of the valve element 230 at the other side of the first axis 234. For example, the first axis 234 may pass through a geometrical center of the valve element 230, and an extra mass may be added to or incorporated in only one side of the valve element 230. As another example, the first axis 234 may be offset (not shown) from a geometrical center of the valve element 230, for example offset (not shown) in the plane of the valve element 230. In this case, even for a valve element 230 of even mass distribution, the center of mass is offset from the first axis 234. The offset of the center of mass of the valve element 230 from the first axis 234 may be arranged such that the valve element 230 is biased (urged) to the first (closed) configuration in use. This biasing may be used, for example, instead of the biasing provided by the spring, or in addition to the biasing provided by the spring.

In some examples, the nozzle structure 202 may comprise one or more small holes 236 in the side wall of the end portion 205 of the tube 204. The holes 236 may extend through the sidewall of the tube 204. These holes 236 may allow airflow to pass through the holes 236 and into the tube 204, thereby preventing build material to spill from the end of the tube 204 in the case of a rapid and/or intempestive removal of the end portion 205 of the tube 204 from the outlet structure 100 of the container 300.

In some examples, the outlet structure 100 comprises a protrusion 232 protruding from an inner wall of the aspiration channel 103 to extend into an end portion 205 of the tube 204 of the nozzle structure 202 that is inserted into the aspiration channel 103 to retain the valve element 230 of the nozzle structure 202 in the second (open) configuration. For example, the protrusion 232 may be arranged to change the configuration of the valve element 230 of the nozzle structure 202 from the first (closed) configuration to the second (open) configuration on insertion of the tube 204 into the aspiration channel 103.

In some examples, the inner wall of the aspiration channel 103 is parallel to the aspiration direction 282 of the aspiration channel 103, and a first component 232a of the protrusion 232 points out of the inner wall of the aspiration channel 103. In some examples, a second component 232b of the protrusion 232 extends parallel to the aspiration direction 282 of the aspiration channel 103. In some examples, the protrusion 232 may protrude from the inner wall of the aspiration channel 103 in a direction upwards, i.e. in a direction towards the nozzle structure 202 that is inserted into the aspiration channel 103.

In some examples, the protrusion 232 may be substantially L shaped. For example, the protrusion 232 may comprise a first portion 232a extending into the aspiration channel 103 perpendicular to the length of the aspiration channel 103, and a second portion 232b extending, from the first portion 232a, parallel to the length of the aspiration channel, so as to define a gap, notch or catch between the second portion 232b and the inner wall of the aspiration channel 103. The side wall of the end portion 205 of the tube 204 may be received in this gap. It will be appreciated that other shapes and/or configurations of the protrusion 232 may be used to extend into the end portion 205 of the tube 204 to retain the valve element 230 in the second (open) configuration. For example, the protrusion 232 may be substantially C shaped (not shown) or shaped substantially as a quarter circle (not shown) or other curve (not shown) As another example, the protrusion 232 may be substantially linear (not shown), and be angled with respect to the inner wall of the aspiration tube 103, for example so as to point towards the connector 107.

In a specific example, the collect structure 102 may comprise a hollow cylinder defining at least part of the aspiration channel 103 and may have an inner diameter of around 45 millimeters, and the first portion 232*a* of the protrusion 232 may extend around 8 millimeters from the inner wall of the cylinder perpendicular to the length of the cylinder, and the second portion 232*b* of the protrusion 232 may extend around 10 millimeters from end of the first portion 232*a* parallel to the length of the cylinder. The resulting gap between inner wall of the cylinder and the second portion 232*b* of the protrusion may be around 5 millimeters, for example. The protrusion 232 may extend into the end 205 of the tube 204 of the nozzle structure 202 when the nozzle structure is connected to connector 107 by around 8 millimeters.

In some examples, the protrusion 232 is arranged to retain the valve element 230 of the nozzle structure 202 in an open (for example fully open) configuration when the nozzle structure 202 is connected to the connector 107. For example, the second portion 232*b* of the protrusion 232 may act upon the valve element 230 of the nozzle structure 202 when inserted into the outlet structure 100 thereby to change the configuration of the valve element 230 from the first (closed) configuration to the second (open) configuration, and to hold it in that configuration. The protrusion 232 may allow the valve element 230 to be automatically changed from the first (closed) configuration to the second (open) configuration (and hence automatically allowing air and/or build material to flow in the tube 204) on insertion of the end portion 205 of the tube 204 into the outlet structure 100.

In some examples, a distal end 232*b* of the protrusion 232 may comprise a slanted portion 232*b*. For example the distal end 232*b* of the second portion 232*b* of the protrusion 232 may be set at an off-perpendicular angle with respect to the second portion of the protrusion 232. This may allow a smooth change (i.e. a reduced rate of change) of the valve element 230 between the first (closed) and second (open) configurations when the end portion 205 of the tube 204 is inserted into or removed from the outlet structure 100.

In some examples, the protrusion 232 is positioned in a predefined location with respect to the connector 107.

As mentioned above, in some examples, the outlet structure 100 may be provided with a socket 120 to receive a data interconnect structure 212 of the nozzle structure 202. In some examples, the socket 120 may also function as an alignment socket to provide alignment of the nozzle structure 202 with the outlet structure 100, and the protrusion 232 may be in a predefined location with respect to the socket 120. In some examples the socket 120 may also function so as to fix the orientation of the nozzle structure 202 with respect to the outlet structure 100 to a predetermined orientation. In some examples, the protrusion 232 may be located at a predefined axial distance from the connector 107, for example at a predefined axial distance from the interface surface 116. The predefined positioning of the protrusion 232 with respect to the connector 107 may allow the valve element 230 to be opened fully by the protrusion 232 when the nozzle structure 202 is connected to the connector 107, and for example, not before the nozzle structure 202 is fully connected to the connector 107.

As another example, the protrusion 232 may be positioned at a predefined location with respect the activation structure 124. For example, the protrusion 232 may be at a predefined axial distance from the activation structure 124. This may ensure that the activation switch 214 of the nozzle structure 202 is activated when, for example only when, valve element 230 is in an open configuration.

In some examples, the relationship between the length of the tube 204 of the nozzle structure 202, the axial distance of the valve element 230 from the end of the tube 204, and the axial distance of the protrusion 232 from the opening of the aspiration channel 103, may be arranged (i.e. predefined) such that the valve element 230 is (fully) opened by the protrusion when the nozzle structure 202 is (fully) operationally connected to the outlet structure 100 (e.g. the activation switch 214 has been engaged by the activation structure 124).

In some examples, the outlet structure 100 may comprise two protrusions 232, for example, protruding from opposite sides of the inner wall of the outlet structure 100. The protrusions 232 may define between them an axis that is offset from a geometrical center of the aspiration channel 103. For example, the offset may be an in a direction perpendicular to the aspiration direction 282. For example, the protrusions 232 may define between them an axis that is offset by around 3 millimeters from a geometrical center of the aspiration channel 103 in a direction perpendicular to the aspiration direction 282. This may be the case, for example, where the first axis 234 about which the valve element 230 pivots passes through a geometrical center of the valve element 230. In this case, the offset is such that when the nozzle structure 202 is connected to the connector 107, both protrusions 232 retain the valve element 230 of the nozzle structure 202 in a fully open configuration. The two protrusions 232 may be positioned such that an axis defined between the two protrusions has a predefined orientation with respect to the connector 107, for example a predefined orientation with respect to the socket 120 functioning as an alignment socket.

In some examples, the protrusions 232 may define between them an axis that passes through a geometrical center of the outlet structure 100 (not shown). For example, the protrusions 232 may define between them an axis that passes through the center of a cross-section of the outlet structure 100 taken in a direction perpendicular to the aspiration direction 282. This may be the case, for example, where the first axis 234 about which the valve element 230 pivots is offset (not shown) from a geometrical center of the valve element 230.

It will be appreciated that in some examples, other shapes and/or configurations of the protrusion 232 or protrusions 232 may be used.

For example, the protrusion 232 may be a straight pin (not shown) extending perpendicularly from the inner wall of the aspiration channel 103. In this example, the end portion 205 of the tube 204 may comprise a lateral opening (not shown), i.e. a vertically orientated slot (not shown), in which the pin (not shown) may enter and slide in when the tube 204 is inserted into the aspiration channel 103. The pin (not shown) may be of a length so as to extend into the end portion 205 of the tube 204 through the slot. In this example, when the tube 204 of the nozzle structure 202 is inserted into the aspiration channel 103, the pin (not shown) may slide up the vertical slot (not shown), and a side of the pin (not shown) may contact the valve element 230 so as to change the configuration of the valve element 230 from the first (closed) to the second (open) configuration, and retain the valve element 230 in the second (open) configuration. The slot (not shown) may comprise, for example, a sealing element (not shown) that seals the slot (not shown) to prevent powder from exiting the slot (not shown). For example each side of the slot (not shown) may comprise a flexible (for example rubber) element (not shown) extending along the length of the slot (not shown) which in default come together to prevent powder from escaping the tube 204, but can be temporarily parted by the pin (not shown) to allow the pin (not shown) to enter and slide in the slot (not shown). As another example, the sealing element (not shown) may comprise an arrangement (for example an outer tube) slidably mounted to the outside of the tube 204 of the nozzle structure 202, and which can be slid along the length of the tube 204 to expose the slots (not shown), for example, by contact with the pin (not shown) on insertion of the tube 204 into the aspiration channel 103.

As another example, the protrusion 232 may be a rod (not shown) extending across the width of the aspiration channel 103 perpendicularly to the aspiration direction 282 so as to join two sides of the inner wall of the aspiration channel 103 (or similarly two protrusions 232 may be joined so as to form a transversal rod (not shown) extending across the width of the aspiration channel 103, for example). In this example, the axis of the transversal rod (not shown) may be offset with respect to a geometrical centre of the aspiration channel 103 in a direction perpendicular to the aspiration direction 282. In this example, similarly to the pin example (not shown), the end portion 205 of the tube 204 of the nozzle structure 202 may comprise two vertical slots (not shown) to allow the transversal rod (not shown) to extend into the end portion 205 of the tube 204 and hence retain the valve element 230 in the open configuration. In this example, the two slots (not shown) may define between them an axis that is offset form a geometrical centre of the tube 204 in a direction perpendicular to the length of the tube 204. Similarly to the pin example (not shown), the slots (not shown) may comprise a sealing element (not shown) to prevent powder from exiting the slots (not shown).

As discussed above with reference to FIGS. 4A, 4B and 5, the nozzle structure 202 may be provided with an activation switch 214 which is used by the 3D printer 402 to monitor the connection between the connector 107 and the nozzle structure 202. In a particular example, the 3D printer 402 may be configured to switch of or power down the aspiration system in response to detecting that the nozzle structure 202 has been disconnected or is in the process of being disconnected from the connector 107. In this case, aspiration may actually continue for a short period after the aspiration system has been powered down due to mechanical lag in the fan or pump providing the negative pressure for aspiration. In this case, the valve structure 230 is returned to its first (closed) configuration during disconnection of the nozzle structure 202 form the connector 107, thereby preventing or reducing unwanted expulsion of build material due to this mechanical lag. Similarly, the value structure 230 ensures that once aspiration has stopped, any loss of build material from the nozzle structure 202 due to gravity can be prevented or reduced.

As mentioned above, in some examples, the outlet structure 100 comprises a valve element 113. The valve element 113 has an open configuration (illustrated in broken lines in FIG. 7) to enable the tube 204, when inserted into the outlet structure 100, to transport build material from the container 300 and a closed configuration (illustrated in full lines in FIG. 4a and FIGS. 7 and 8) to inhibit build material from exiting the container 300. In some examples, the valve element 113 is fixed between the flange portion 131 and the tube portion 130. In some examples, the valve element 113 changes from the closed configuration to the open configuration in response to the tube 204 being inserted in the outlet structure 100 and changes from the open configuration back to the closed configuration in response to the tube 204 being removed from the outlet structure 100. The valve element 113 may be biased towards the closed configuration. The valve element 113 inhibits build material, for example powder that may be in suspension (e.g. floating) in the container 300, from exiting the container 300 when the tube 204 is being inserted into outlet structure 100 and when the tube 204 is being removed from the outlet structure 100.

The valve element 113 may comprise one or more sections 113a (nine sections are shown in FIG. 4a although for clarity only one is labelled) that define a barrier that substantially closes the outlet structure 100 when the valve element 113 is in the closed configuration (See FIG. 4A) and which are displaced to open the outlet structure 100 when the valve element changes to the open configuration (see FIGS. 7 and 8). In one example, when the tube 204 is inserted into the outlet structure 100 when the nozzle structure 202 is being connected to the outlet structure 100, the end portion 205 of the tube 204 pushes past the one or more sections 113a which are urged, for example deformed, bent or turned, by the tube 204, inwardly of the outlet structure 100 thereby changing the valve element 113 into the open configuration as the end portion 205 of the tube 204 pushes past. In the open configuration, each section 113a extends substantially parallel with the longitudinal axis of the tube portion 130 and is kept pressed against the inner wall of the tube portion 130 by the tube 204.

In some examples, the closure of barrier that is defined by the valve element 113 when it is in the closed configuration is substantially planar and may be substantially circular.

In some examples, the valve element 113 is biased towards the closed configuration. In some examples, each of the one or more sections 113a may comprise a resilient material and the resilience of the material may act to return each of the one or more sections 113a to the position it adopts when the valve element 113 is in the closed configuration. In some examples, each of the one or more sections 113a is hinged inside of the outlet structure 100 and a biasing means, for example a resilient member such as a spring, is arranged to bias each section 113a to the position it adopts when the valve element 113 is in the closed configuration.

Figure 10:
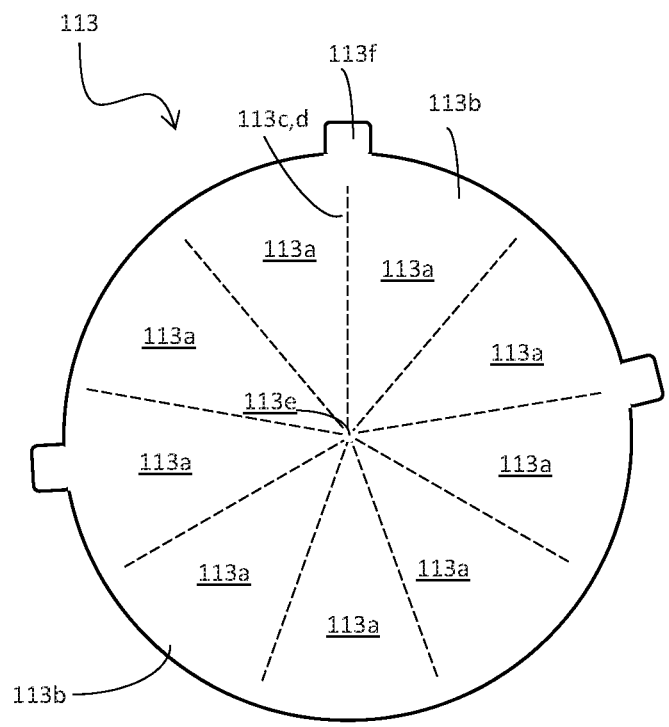
FIG. 10 is a schematic diagram showing an example of a valve element.

As is best illustrated in FIG. 10, in some examples, the valve element 113 comprises a thin sheet of flexible material that may be, for example, generally circular in plan-view when in the closed configuration. In the example illustrated in FIG. 10, when the valve element 113 is in the closed configuration, each of the plurality of segments 113a (as an example, 9 segments are illustrated in FIG. 10) substantially defines a segment of a circle and comprises an arc shaped outer (e.g. circumferential) first edge 113b (for clarity only 2 of the 9 first edges in this example are labelled in FIG. 10) and second 113c and third 113d inner (e.g. radial) edges (for simplicity in FIG. 10 adjacent first edges and second edges respectively of adjacent segments 113a are represented by a single broken line one of which is labelled 113c,d). Each arc shaped outer first edge 113b is contiguous with the arc shaped outer first edges 113b that are either side of it so that, in effect, the valve element 113 comprises a contiguous ring of material for example, defining its outer perimeter. The second 113c and third 113d inner edges of each of the plurality of segments 113 are free (e.g. cut) edges that are not contiguous with the next segment 113a. In the closed configuration, the corner of each segment 113a that is defined by its second 113c and third 113d inner edges is positioned towards the center of the valve element 113 and these corners of the segments 113a define a small aperture 113e that is substantially at the center of the valve element 113. The valve element 113 may further comprise, for example, one or more tabs 113*f* (as example 3 are shown in FIG. 10) spaced apart around the circumference of the valve element 113 that are used to locate and/or fix the valve element 113 in the outlet structure 100. For example, the one or more tabs 113*f* may be each located in a structure (not shown), for example a recess, formed in the outlet structure 100.

In this example, when the end portion 205 of the tube 204 is pushed against the valve element 113 when it is in the closed configuration each of the plurality of segments 113*a* bends about its outer first edge 113*b* and is pushed aside by the tube 204 in the manner of a flap as the tube 204 passes through the valve element 113 thereby placing the valve 113 into the open configuration. When the tube 204 is removed from the outlet structure 100 (and hence no longer exerts a force on the segments 113*a*) the resilience (e.g. natural springiness) of each segment 113*a* returns that segment to the position it has when the valve element 113 is in the closed configuration.

The valve element 113 and its one or more segments 113*a* may comprise any suitable material including silicone, polyethylene terephthalate (PET) including Mylar, or indeed any suitable plastic or other material. The valve element 113 and its one or more segments 113*a* may comprises at least a surface coating of a 'non-stick' material such as Teflon™ to inhibit build material dust coating the valve element 113.

In other examples, the end portion 205 of the tube 204 does not push open the valve element 113 when the tube 204 is inserted in the outlet structure 100 but instead is positioned above the valve element 113 when the nozzle structure 202 is connected to the outlet structure 100. In such examples, the valve element 113 may change from the closed configuration to the open configuration by a vacuum force being applied to the outlet structure after the nozzle structure has been connected to the outlet structure 100 for example when a partial evacuation of air in the reservoir 302 has been caused by the commencing of the aspiration process.

In some examples, the nozzle structure 202 and the outlet structure 100 may be arranged such that on insertion of the end portion 205 of the tube 204 into the outlet structure 100, the outlet structure valve element 113 changes from the closed configuration to the open configuration before the nozzle structure valve element 230 changes from the first (closed) configuration to the second (open) configuration. This may allow for an overall minimization of spillage and or escape of build material when the end portion 205 of the tube 204 is inserted into the outlet structure 100.

In some examples, the nozzle structure 202 and the outlet structure 100 may be arranged such that on removal of the end portion 205 of the tube 204 from the outlet structure 100, the nozzle structure valve element 230 changes from the second (open) configuration to the first (closed) configuration before the outlet structure valve element 113 changes from the open configuration to the closed configuration. This may allow for an overall minimization of spillage and/or escape of build material when the end portion 205 of the tube 204 is removed from the outlet structure 100.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of at least one such element, neither requiring nor excluding two or more such elements. Further, the terms "include" and "comprise" are used as open-ended transition.

A Further example is described in the following numbered clause:

1. A [3D] printing system comprising:
    an aspiration system comprising a tube;
    a build material container comprising an outlet structure and a reservoir to hold build material, wherein the outlet structure comprises:
        a valve element having:
            an open configuration to enable the tube, when inserted in the outlet structure, to aspirate build material from the container; and
            a closed configuration to inhibit build material from exiting the container;
        wherein the valve element changes from the closed configuration to the open configuration by at least one of:
            the tube being inserted in the outlet structure; and
            a vacuum force being applied to the outlet structure when the tube has been inserted in the outlet structure.

What is claimed is:

1. A 3D printing build material container outlet structure, the outlet structure comprising:
    an aspiration channel;
    a valve element positioned inside of the aspiration channel, the valve element having:
        an open configuration to enable a tube, when inserted in the outlet structure, to aspirate build material through the aspiration channel from the container; and
        a closed configuration to inhibit build material from exiting the container through the aspiration channel;
    wherein the valve element changes from the closed configuration to the open configuration by at least one of:
        the tube being inserted in the outlet structure; and
        a vacuum force being applied to the outlet structure when the tube has been inserted in the outlet structure; and
    a protrusion protruding from an inner wall of the aspiration channel, wherein the protrusion is to retain a valve element of the tube when the tube is inserted into the aspiration channel.

2. The outlet structure of claim 1, wherein the valve element is to change from the open configuration to the closed configuration by at least one of:
    the tube being removed from the outlet structure; and
    a vacuum force being discontinued from being applied to the outlet structure.

3. The outlet structure of claim 1, wherein the valve element is to inhibit build material dust from exiting the container when the tube is being inserted into or removed from the outlet structure.

4. The outlet structure of claim 1 wherein the valve element comprises one or more sections and wherein the one or more sections define a barrier that substantially closes the outlet structure when the valve element is in the closed configuration and wherein the one or more sections are displaced to open the outlet structure when the valve element changes to the open configuration.

5. The outlet structure of claim 4, wherein, when the valve element is in the closed configuration the barrier is substantially planar.

6. The outlet structure of claim 5, wherein, when the valve element is in the closed configuration the barrier is substantially circular.

7. The outlet structure of claim 4, wherein each of the one or more sections is urged inwardly of the outlet structure by the tube or the vacuum force to change the valve element from the closed configuration to the open configuration.

8. The outlet structure of claim 7, wherein each of the one or more sections bends, or rotates about a hinge, inwardly of the outlet structure to change the valve element from the closed configuration to the open configuration.

9. The outlet structure of claim 4, wherein each of the one or more sections comprises a first edge that is connected to an inner section of the outlet structure and wherein each of the one or more sections bends or rotates about its first edge when the valve element changes from the closed configuration to the open configuration and vice versa.

10. The outlet structure of claim 9 wherein the valve element comprises a plurality of the sections and each of the plurality of sections defines a sector of a circle and each of the plurality of sections comprises second and third edges and wherein the first edge of a given section is an arc of the sector defined by that section and the second and third edges of a given section are free edges.

11. The outlet structure of claim 4, wherein the valve element comprises a plurality of the sections and the plurality of sections are separated and/or spread apart by the aspiration tube when the aspiration tube is inserted into the outlet structure or when the vacuum force is applied to change the valve element from the closed configuration to the open configuration.

12. The outlet structure of claim 4 wherein each of the one or more sections is biased towards a positon it adopts when the valve element is in the closed configuration.

13. The outlet structure of claim 12 wherein each of the one or more sections is resiliently biased towards the positon it adopts when the valve element is in the closed configuration.

14. The outlet structure of claim 4, wherein the one or more sections comprises at least one of silicone, a plastics material, and/or a non-stick material.

15. The outlet structure of claim 1 wherein the valve element comprises a flexible sheet that defines one or more sections.

16. The outlet structure of claim 15, wherein the valve element or sections of the valve element are to be bent from a closed position to an open position by a pushing force when the valve element changes from the closed configuration to the open configuration and wherein, when the pushing force is released, the valve element or sections of the valve element are to return from the open position to the closed position as the valve element changes from the open configuration to the closed configuration.

17. The outlet structure of claim 1 wherein the valve element comprises a plurality of sections and each of the sections extends approximately perpendicularly to an inner wall of the outlet structure when the valve element is in the closed configuration.

18. The outlet structure of claim 1 wherein the valve element is biased towards the closed configuration.

19. The outlet structure of claim 1, wherein the valve element is located at or near an opening of the outlet structure and wherein the protrusion is located behind the valve element and is substantially L-shaped.

20. The outlet structure of claim 1, wherein the outlook outlet structure comprises an interface surface that is substantially perpendicular to an aspiration direction of the outlook structure, the interface surface to interface with a nozzle structure that has the tube, wherein the valve element is located inside the outlook structure a predefined axial distance from the interface surface.

* * * * *